United States Patent [19]

Watanabe et al.

[11] 3,784,734

[45] Jan. 8, 1974

[54] COLOR IMAGE PICKUP DEVICE

[75] Inventors: Toshiro Watanabe; Yasuharu Kubota, both of Kanagawa-ken, Japan

[73] Assignee: Sony Corporation, Tokyo, Japan

[22] Filed: Oct. 12, 1971

[21] Appl. No.: 188,029

[30] Foreign Application Priority Data

Oct. 14, 1970 Japan .............................. 45/90214

[52] U.S. Cl. .............................................. 178/5.4 ST

[51] Int. Cl. .............................................. H04n 9/06

[58] Field of Search ............................... 178/5.4 ST; 350/162 SF

[56] References Cited

UNITED STATES PATENTS

| | | | |
|---|---|---|---|
| 3,716,666 | 2/1973 | Larsen | 178/5.4 ST |
| 2,696,520 | 12/1954 | Bradley | 178/5.4 ST |
| 3,647,946 | 3/1972 | Enloe | 178/5.4 ST |
| 3,647,948 | 3/1972 | Eto et al. | 178/5.4 ST |

*Primary Examiner*—Richard Murray
*Attorney*—Lewis H. Eslinger et al.

[57] ABSTRACT

A color image pickup device of the type in which the image is separated into individual colors by a striped filter and is focused on the photoelectric conversion layer of a camera tube. To avoid moire patterns in the reproduced television image, means are provided between the filter and the object being televised to form multiple images of the object spaced apart by an integral multiple of *p*/N in which 1/N is the duty cycle of the color component stripes and *p* is the pitch of the stripes.

10 Claims, 24 Drawing Figures

COLOR IMAGE PICKUP DEVICE

BACKGROUND OF THE INVENTION

1. Field of the Invention

This invention relates to a color image pickup device designed such that a color-separated image is formed on the photoelectric conversion layer of one image pickup tube by a striped filter and more than two kinds of color signals are derived from the tube. More particularly, the invention provides a color image pickup device capable of producing color video signals which do not cause any moire in the reproduced picture.

2. The Prior Art

A color image pickup device usually employs three image pickup tubes corresponding to the three primary colors, red, green, and blue, to provide three color signals; but three color signals can also be obtained with one image pickup tube. A phase separating type color image pickup device is known as a color image pickup device capable of providing three signals. In this kind of color image pickup device a striped color-separated image of an object being televised is formed by a stripe filter on the photoelectric conversion layer of the image pickup tube, and the conversion layer is scanned with an electron beam across the stripes of the striped color-separated image to derive a photoelectric conversion signal from the image pickup tube. Three primary color signals can be separately extracted by phase separation from the photoelectric conversion signal.

Generally, the phase separating type color image pickup device requires an index signal for separating individual color signals from the combined photoelectric conversion signal derived from the image pickup tube.

It is one of the objects of the present invention to provide a color image pickup device adapted to produce a composite signal composed of an index signal and a chrominance signal superimposed on each other and derived from the image pickup tube by previously establishing a predetermined potential distribution on the photoelectric conversion layer so as to produce well-balanced color signals without causing crosstalk therebetween.

DETAILED DESCRIPTION OF THE INVENTION

Figure 2:
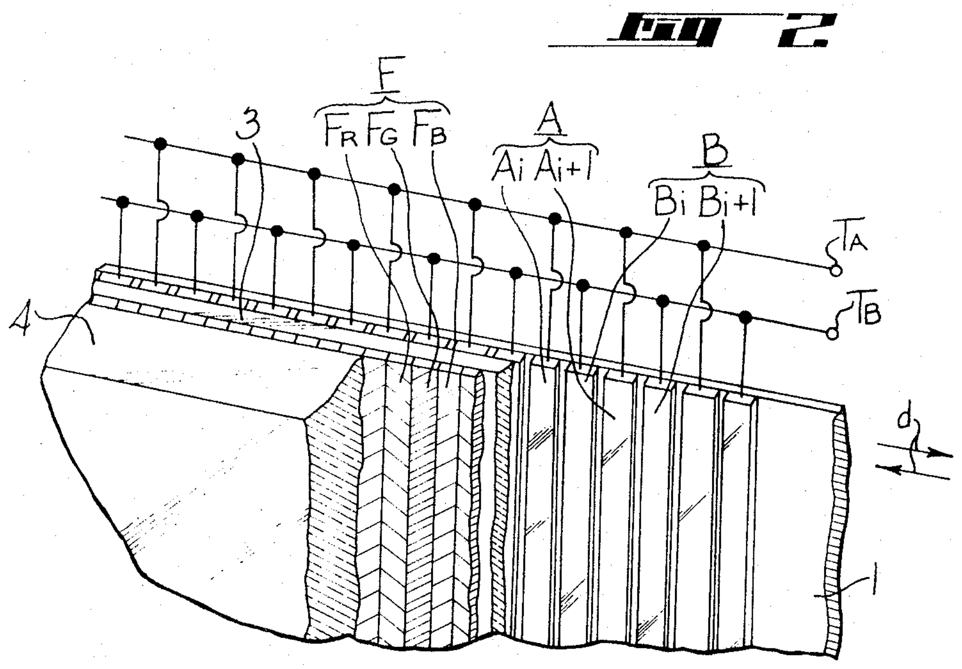
FIG. 2 is a perspective view showing a fragment of the principal part of an image pickup tube employed in the image pickup device in FIG. 1.

A description will be given first of an image pickup tube. The target end of the tube is shown in FIG. 2 and comprises a plurality of sets of nesa electrodes $A_1$, $B_1$, . . . $A_n$, $B_n$ having a predetermined width of, for example, 5 microns interleaved in a repeating cyclic order at predetermined intervals of, for example, 30 microns on a photoelectric conversion layer 1, such as a photoconductive layer of antimony trisulfide, which is scanned by an electron beam. The electrodes $A_1$, . . . $A_n$ and $B_1$, . . . $B_n$ are indicated as electrodes A and B, respectively. In this case, these electrodes A and B are arranged so that their longitudinal directions are different from the electron beam horizontal scanning direction, which is indicated by an arrow *d*. In the example shown, the electron beam horizontal scanning direction d and the longitudinal directions of the electrodes A and B are perpendicular to each other. The electrodes A and B are connected together in two groups to signal output terminals $T_A$ and $T_B$, respectively. The electrodes A and B are formed on a transparent, protective, insulating plate, for example a glass plate, 3 on which the photoelectric conversion layer 1 is formed. On the other side of the glass plate 3 is disposed an optical filter F which consists of red, green, and blue optical strip filter elements $F_R$, $F_G$, and $F_B$ of a predetermined width which are sequentially arranged at predetermined intervals in a repeating cyclic order $F_R$, $F_G$, $F_B$, $F_R$, $F_G$, $F_B$, . . . so arranged that each triad of red, green, and blue optical strip filter elements may be opposite to one pair of adjacent electrodes $A_i$ and $B_i$ of the aforementioned electrodes A and B. The arrangement is such that the longitudinal directions of the strip filter elements agree with those of the electrodes A and B. A faceplate glass 4 covers the optical filter F.

Figure 1:
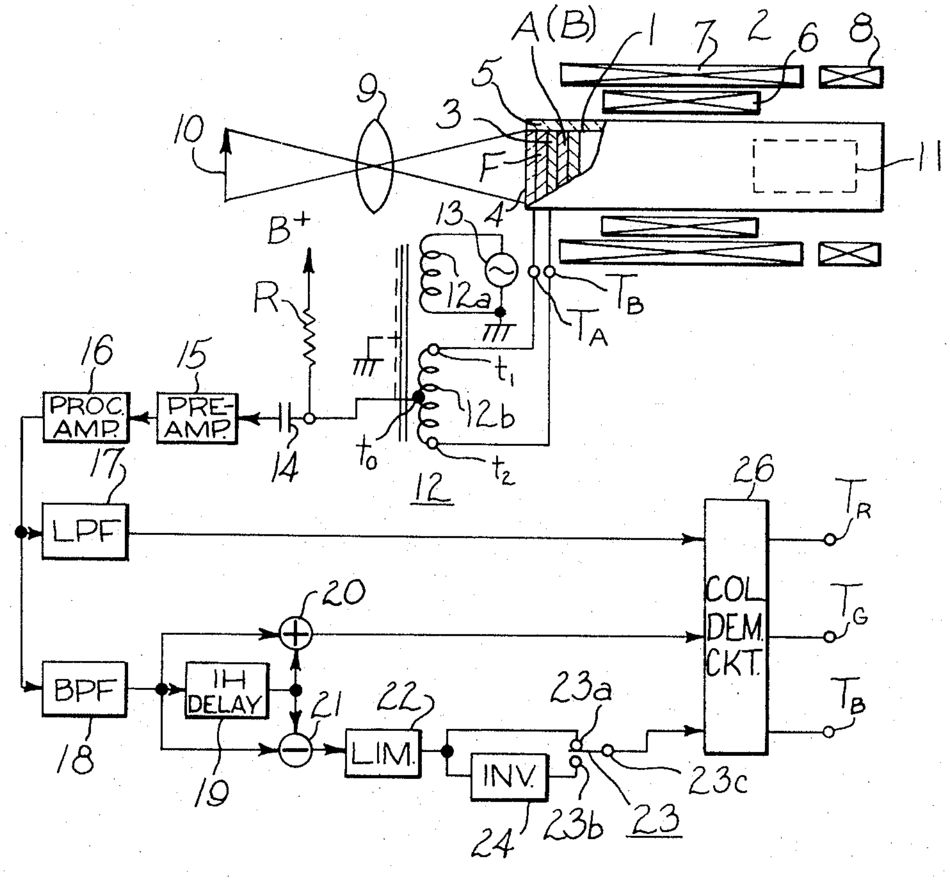
FIG. 1 is a system diagram showing one example of a color image pickup device to which the present invention is applicable.

The photoelectric conversion layer 1, the electrodes A and B, the glass plate 3, the optical filter F and the faceplate glass 4 are combined in a disc-like configuration having a diameter of 2.54 cm., for example, and attached to one end of a pickup tube envelope 5 shown in FIG. 1. The tube envelope 5 has a deflection coil 6, a focusing coil 7, and an alignment coil 8 mounted thereon. Reference numeral 9 indicates a camera lens by means of which rays of light from an object 10 that is to be televised enter the tube envelope 5 through the faceplate 4 and are focused on the photoelectric conversion layer 1. Reference numeral 11 designates an electron gun.

Figure 3:
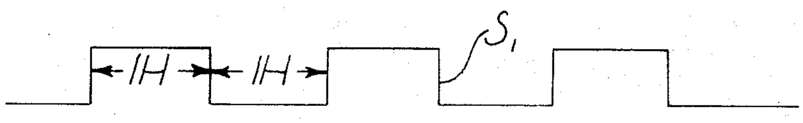
FIGS. 3 and 4 are waveform diagrams for explaining the color image pickup device of FIG. 1.

During operation of the pickup device, an alternating signal $S_1$, shown in FIG. 3, is supplied to the electrodes A and B. For example, a transformer 12 may be provided, and the end $t_1$ and $t_2$ of its secondary winding 12*b* connected to the signal output terminals $T_A$ and $T_B$, respectively. A signal source 13 is provided for generating the alternating signal $S_1$, which is synchronized with the horizontal scanning period of an electron beam on the photoelectric conversion layer 1, and the signal source is connected to a primary winding 12*a* of the transformer 12. The alternating signal $S_1$ is a rectangular wave which has a pulse width 1H equal to the electron beam horizontal scanning period H. For the NTSC system, this is a pulse width of 63.5 $\mu$ sec. The signal $S_1$ has a repetition rate of one half of the horizontal scanning frequency, which is 15.75/2 KHz for an NTSC system. Such an alternating signal $S_1$ may be produced by making use of a pulse signal derived from the DC—DC converter of a high voltage generator circuit, for example. Such DC—DC converters are wellknown and need not be described here. The center tap $t_0$ of the secondary winding 12*b* of the transformer 12 is connected to the input side of a preamplifier 15 through a capacitor 14, and a DC power source of, for example, 10 to 50V is connected to the center tap $t_0$ of the secondary winding 12*b* through a resistor R.

Instead of providing such a transformer 12, it is also possible to connect resistors in series between the terminals $T_A$ and $T_B$, connect their connection point to the input terminal of the preamplifier 15 through a capacitor and supply the aforementioned rectangular wave to the electrodes A and B through capacitors.

Figure 5:
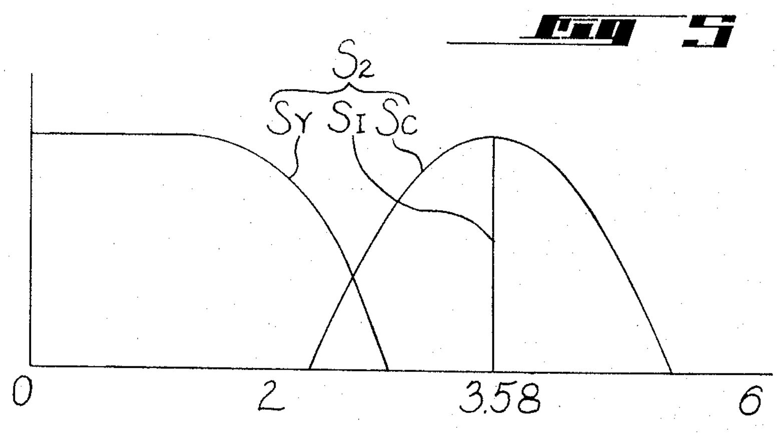
FIG. 5 is a graph illustrating one example of the frequency spectrum of a composite color signal obtainable with the color image pickup device of FIG. 1.
Figure 4:
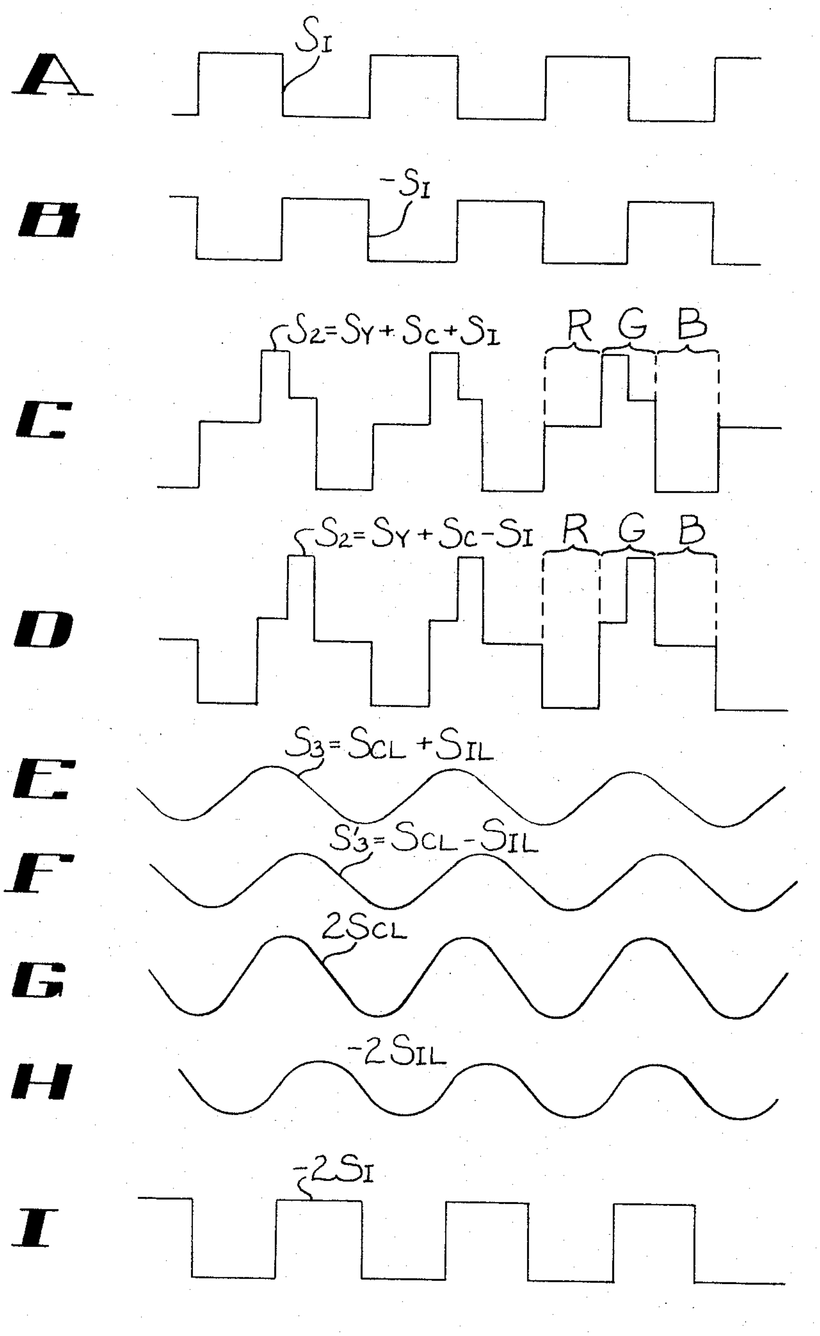

With the arrangement shown in FIG. 1, in a certain horizontal scanning period $H_i$ the electrode A is supplied with a superimposed voltage consisting of the voltage derived from the DC power source B+ and the signal $S_1$ shown in FIG. 3. The electrode B is supplied with only the voltage from the DC power source B+, so that the potential at the electrode A exceeds that of the electrode B, thus forming a striped charge image on the photoelectric conversion layer 1 corresponding to the electrode A. When no light from the object 10 is incident on the image pickup tube 2 during the horizontal scanning period $H_i$, a rectangular wave signal $S_I$, such as shown in FIG. 4A, is derived at the input side of the preamplifier 15 corresponding to the electrode A. This signal $S_I$ serves as an index signal, the frequency of which is determined by the widths and spacings of the electrodes A and B and by the time required for one horizontal scanning period of the electron beam. In this case, the frequency of the index signal $S_I$ is set at, for example, 3.58MHz. Then, when rays of light from the object 10 are focused on the photoelectric conversion layer 1, a signal corresponding to the color-separated image on the photoelectric conversion layer 1 is superimposed on the index signal $S_I$ to provide a composite signal $S_2$, such as depicted in FIG. 4B. In the figure those portions of the composite signal $S_2$ which correspond to the red, green, and blue colored light are marked with R, G, and B, respectively. The composite signal $S_2$ is expressed by the sum of a luminance signal $S_Y$, a carrier color, or chrominance, signal $S_C$ and the index signal $S_I$, namely $S_2 = S_Y + S_C + S_I$. The frequency spectrum of the composite signal $S_2$ is determined, for example, as depicted in FIG. 5, considering the widths and spacings of the electrodes A and B and the strip filter elements $F_R$, $F_G$, and $F_B$ of the optical filter F and the horizontal scanning period. That is, the composite signal $S_2$ is positioned in a band of 6MHz as a whole. The luminance signal $S_Y$ occupies the lower frequency portion of this band, and the chrominance signal $S_C$ occupies the higher frequency portion. In this case, it is preferred to minimize the overlapping of the luminance signal $S_Y$ and the chrominance signal and, if necessary, resolution can be lowered a little by placing a lenticular lens in front of the image pickup tube 2 to narrow the band of the luminance signal $S_Y$.

In the subsequent horizontal scanning period $H_{i+1}$, the voltages (the alternating signal) fed to the electrodes A and B are reversed in phase. Accordingly, a resulting index signal $-S_I$, as shown in FIG. 4A', is produced. This index signal is opposite in phase to the index signal $S_I$ depicted in FIG. 4A. As a result of this, a composite signal $S_2'$ is derived at the input side of the preamplifier 15, as shown in FIG. 4B', namely $S_2' = S_Y + S_C - S_I$.

Such a composite signal $S_2$ (or $S_2'$) is supplied to the preamplifier 15 to be amplified and is then fed to a processing amplifier 16 to be subjected to wave shaping and $\gamma$ correcting. Thereafter, the composite signal is applied to a low-pass filter 17 and to a band-pass filter (or a high-pass filter) 18, respectively, thus deriving the luminance signal $S_Y$ from the low-pass filter 17 and a signal $S_3 = S_{CL} + S_{IL}$, such as is shown in FIG. 4C (or $S_3' = S_{CL} - S_{IL}$, such as is shown in FIG. 4C') from the band-pass filter 18. In this case, $S_{CL}$ and $S_{IL}$ are low-frequency components (fundamental wave components) of the chrominance signal $S_C$ and the index signal $S_I$, respectively.

The index signal $S_I$ and the chrominance signal $S_C$ have the same frequency, so that they cannot be separated by using a filter but can be separated in the following manner. The output of the filter 18 is connected to a delay circuit 19 which delays by one horizontal scanning period 1H the signal $S_3 = S_{CL} + S_{IL}$ (or $S_3' = S_{CL} - S_{IL}$). This delay circuit may be made up of a crystal, for example. The signal $S_3 = S_{CL} + S_{IL}$ (or $S_3' = S_{CL} - S_{IL}$) derived from the delay circuit 19 in the horizontal scanning period $H_i$ and the signal $S_3' = S_{CL} - S_{IL}$ (or $S_3 = S_{CL} + S_{IL}$) derived from the band-pass filter 18 in the subsequent horizontal scanning period $H_{i+1}$ are added together in an adder circuit 20. In this case, the chrominance signal $S_C$ in adjacent horizontal scanning periods can be regarded as substantially the same, so that a carrier color signal $2S_C$, such as is shown in FIG. 4D, is provided as the sum of the signals $S_3$ and $S_3'$.

Further, the signals from the filter 18 and the delay circuit 19 are supplied to a subtracting circuit 21. During one horizontal scanning interval, the output of the subtracting circuit is $S_3 - S_3'$, or $(S_{CL} + S_{IL}) - (S_{CL} - S_{IL}) = 2S_{IL}$. During the next scanning interval the output of the subtracting circuit is $S_3' - S_3$, or $(S_{CL} - S_{IL}) - (S_{CL} + S_{IL}) = -2S_{IL}$, as shown in FIG. 4E. Such an index signal $-2S_{IL}$ (or $2S_{IL}$) is fed to a limiter amplifier 22 to limit its amplitude to a constant value, thus providing an index signal $-2S_I$, such as depicted in FIG. 4F (or $2S_I$, not shown).

The output of the limiter 22 is connected to one of the fixed terminals 23*a* of a change-over switch 23 (an electronic switch, in practice). The switch has another fixed contact 23*b* and a movable contact 23*c*. The output side of the limiter amplifier 22 is also connected through an inverter 24 to the other fixed contact 23*b*. The movable contact 23*c* is actuated to engage the fixed contacts 23*a* and 23*b* alternately and to be switched from one to the other at the end of every horizontal scanning line in synchronism with the alternating signal $S_1$ impressed across the primary winding of the transformer 12. As a result, the index signal $2S_I$ is obtained from the movable contact 23*c* at all times.

The movable contact 23*c* is connected to a color demodulator 26 to supply the signal $2S_I$ thereto. The demodulator 26 is also supplied with the luminance signal $S_Y$ and the chrominance signal $S_C$ so that red, green, and blue color signals $S_R$, $S_G$, and $S_B$ can be obtained at output terminals $T_R$, $T_G$, and $T_B$, respectively. The color demodulator circuit 26 includes a synchronous detector circuit which produces color difference signals $S_R$—$S_Y$, $S_B$—$S_Y$ and $S_G$—$S_Y$ by sampling the carrier color signal $S_C$ with a signal produced by shifting the phase of the index signal $S_I$ as predetermined. It also includes a matrix circuit that adds the luminance signal $S_Y$ to the color difference signals thus obtained to provide the primary color signals $S_R$, $S_G$, and $S_B$. By suitably processing the red, green, and blue color signals thus produced, a color television signal of the NTSC or other various systems can be obtained.

In the present case, the NTSC system signal can also be directly obtained by using the color signal producing circuit 26 and without producing the color signals. To do so, the index signal $S_I$, which is the carrier of the composite signal $S_3 = S_{CL} + S_{IL}$, is replaced by a color subcarrier (having a frequency of 3.58MHz) of the NTSC system, and the color subcarrier, properly modulated by the carrier color signal, is added.

With such a color image pickup device, color images can be produced by only one image pickup tube, with no crosstalk between the respective color signals, and the optical system is simplified. Further, since the index signals are formed with charge images which can be periodically changed over, the index signals can be readily obtained, so that the color signals can be easily demodulated. In addition, no light is used for producing the index signals, so that the ratio of utilization of light is raised and the dynamic range of the photoelectric conversion layer is thereby widened.

In phase-separation type color image pickup devices, including the one just described, the chrominance component is contained in the output signal from the image pickup tube in the form of an amplitude-modulated signal which is produced by amplitude-modulating the carrier with the color signals. In the case where the frequency band of the luminance signal overlaps that of the carrier color signal, there may occur such troubles such as a moiré pattern and cross color in the reproduced picture, disorder of the index signal (the reference signal), mixing of the side band wave of the carrier color signal into the luminance signal, and so on.

The moiré pattern is produced when the luminance signal and the carrier of the chrominance signal beat with each other to produce, for example, a vertical pattern in the reproduced picture. The moiré pattern is classified as either a white moiré or a chroma moiré. The white moiré is a pattern which is produced in the reproduced picture when televising the image of an object having a demarcation line between areas of great brightness difference cross the stripes of the color-separated image on the photoelectric conversion layer of the image pickup device at a small angle. This white moiré is quite conspicuous.

The white moiré does not appear in the reproduced picture when the white balance is maintained. Instead, it appears in the reproduced picture when the white balance is lost by dispersion in the conversion efficiency of the photoelectric conversion layer and the spectral sensitivity of the color strip filter of the image pickup tube. Accordingly, if this moiré can be prevented, accuracy of the characteristics of the photoelectric conversion layer and the color strip filter need not be so high.

The chroma moiré is a color strip which is caused by disagreement between the sampling position on the photoelectric conversion layer for one color and the position of a stripe of that color of the strip-like color-separated image of the object being televised. Avoidance of generation of the chroma moiré naturally leads to avoidance of production of the white moiré. Further, if the chroma moiré is avoided, the aforementioned disorder of the index signal and mixing of the side band wave of the carrier color signal into the luminance signal can be similarly avoided.

Such moirés and troubles attendant thereon can be prevented by selecting the frequency bands of the luminance signal and the carrier color signal so that they do not overlap each other electrically or optically. An optical low-pass filter can be provided in the optical system of the image pickup tube. In such a case, however, the frequency band of the luminance signal is inevitably narrowed because the frequency band of the composite signal or the color video signal is limited to, for example, 6MHz. Accordingly, resolution of the color video signal from the image pickup device is inevitably reduced.

The present invention provides such a color image pickup device capable of producing a color video signal that does not produce any moiré and does not sacrifice its resolution.

A detailed description will be given of the mechanism of generation of chroma moiré.

The optical filter F in FIG. 2 is made up of red, green, and blue optical strip filter elements $F_R$, $F_G$, and $F_B$ having a duty ratio given by the equation $1/N = 1/3$. The image of, for example, a red rod *m* projected on the photoelectric conversion layer across the optical strip filter elements of the optical filter F at a small angle thereto, is as shown in FIG. 6A. The filter F in FIG. 6A corresponds to the optical filter shown in FIG. 2 and consists of red, green, and blue optical strip filter elements $F_R$, $F_G$, and $F_B$. Electron beam scanning lines $L_n$, $L_{n+1}$, $L_{n+2}$, . . . filter elements. The red portions Ma of the color-separated image of the red rod m projected on the photoelectric conversion layer are shown in solid lines, and the portion Mb of the image of the red rod m that cannot pass through the optical strip filter elements $F_G$ and $F_B$ and is not projected on the photoelectric conversion layer is indicated by dotted lines. In this case, there is naturally formed on the photoelectric conversion layer red, green, and blue stripes of the object with a duty ratio of $1/N = 1/3$.

Separation of the red, green and blue color signals from the chrominance signal derived from the image pickup tube is achieved by synchronous detection with the color signal producing circuit 26 of FIG. 1 or by sampling with sampling signals corresponding to the phase and width of the respective color signals contained in the carrier color signal. These methods for the separation of the color signals are the same in principle. The following description applies particularly to the separation of the respective color signals by the sampling method.

FIGS. 6B, 6C, and 6D show red sampling pulses $SPR_n$, $SPR_{n+2}$, $SPR_{n+5}$ for sampling the red color signals for the scanning lines $L_n$, $L_{n+2}$, and $L_{n+5}$, respectively. Reference character $r$ designates red color signals sampled by the red sampling pulses. The red color signals $r$ in the chrominance signals for the scanning lines $L_n$, $L_{n+1}$, $L_{n+7}$ and $L_{n+8}$ are also sampled by the red sampling pulses, but only the red color signal sampled by the sampling pulse $SPR_n$ for the scanning line $L_n$ is shown in FIG. 6B. No red color signal $r$ is obtained by sampling the chrominance signals for the scanning lines $L_{n+2}$, $L_{n+3}$, $L_{n+4}$, $L_{n+5}$ and $L_{n+6}$. (In FIGS. 6C and 6D, only the red color signals $r$ sampled by the sampling pulses $SPR_{n+2}$ and $SPR_{n+5}$ for the scanning lines $L_{n+2}$ and $L_{n+5}$ are shown.) When an image is produced from such color video signals, red moirés STR are produced, as depicted in FIG. 7. In this case, if red color signals are obtained by sampling the red sampling pulses from the carrier color signals for all the electron beam scanning lines in the area on the photoelectric conversion layer in which the image of the red rod m being televised lies, no moiré is produced.

In the color image pickup device of the present invention arranged so that a striped color-separated image of an object being televised is projected by the striped color filter on the photoelectric conversion layer of the image pickup tube, there is interposed between the object and the striped color filter a multiple image-producing optical means by which images of the object superimposed N times are projected on the photoelectric conversion layer at intervals of an integral multiple of P/N in the direction of array of the primary color component stripes of the striped color-separated image, where the duty ratio and the pitch of each of the primary color component stripes are selected 1/N and $P$, respectively.

In the color image pickup device described in connection with FIGS. 1 and 2, the primary color component stripes of the striped color-separated image projected on the photoelectric conversion layer are red, green, and blue stripes and their duty ratio is 1/N = ⅓. Further, the optical filter F is formed in close contact with the photoelectric conversion layer 1 so that the pitch of the primary color component stripes is also that of the elements $F_R$, $F_G$, and $F_B$ of the optical filter F. In the present example, three images of the project 10 are projected on the photoelectric conversion layer 1 at intervals of, for example, $p/N = p/3$ in the direction of array of the primary color stripes of the striped color-separated image, and consequently in the direction of the strip filter elements $F_R$, $F_G$, and $F_B$ of the optical filter F.

Figure 6:
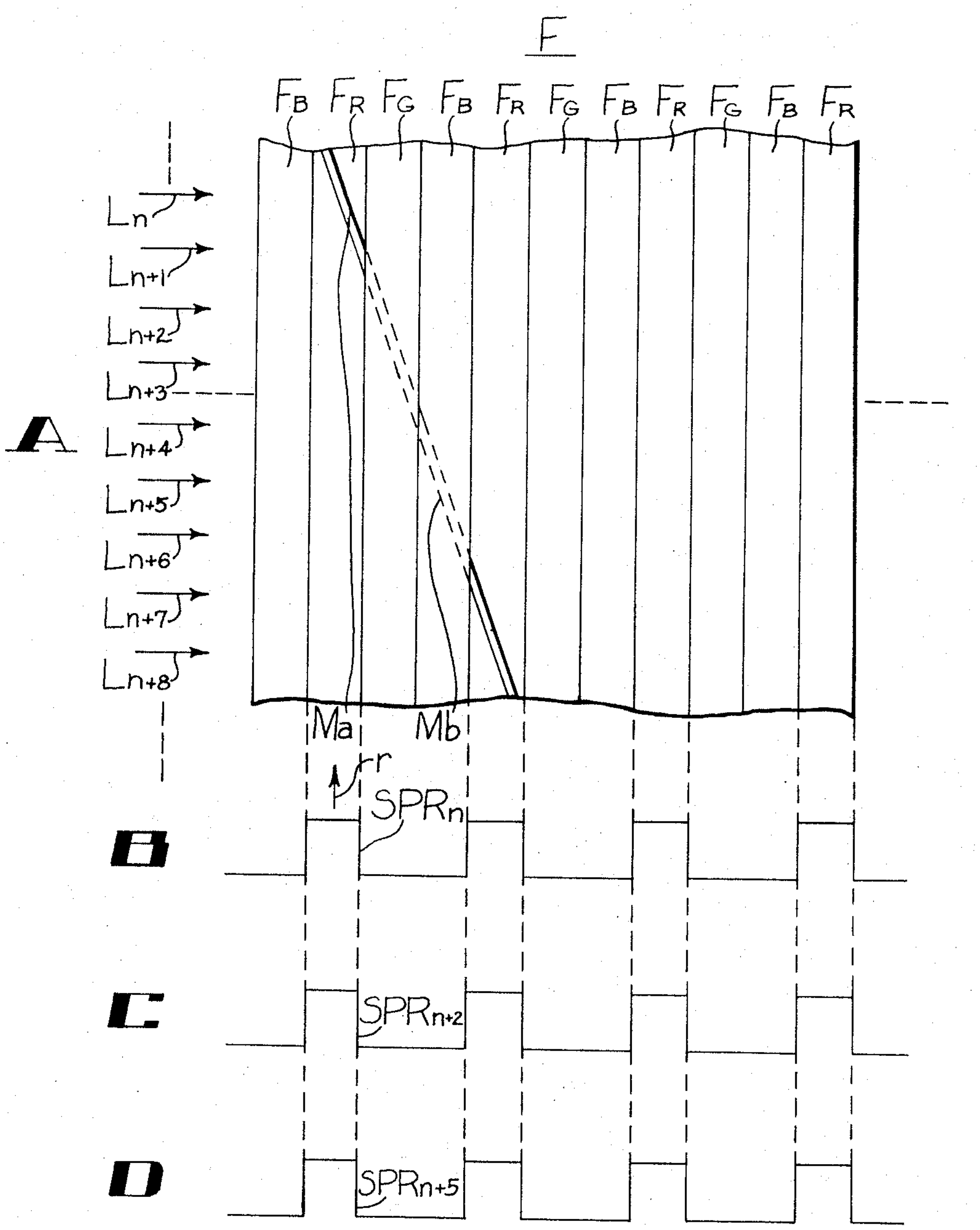
FIG. 6 is a diagram showing the relationship between an optical filter and sampling pulses in accordance with the present invention.
Figure 7:
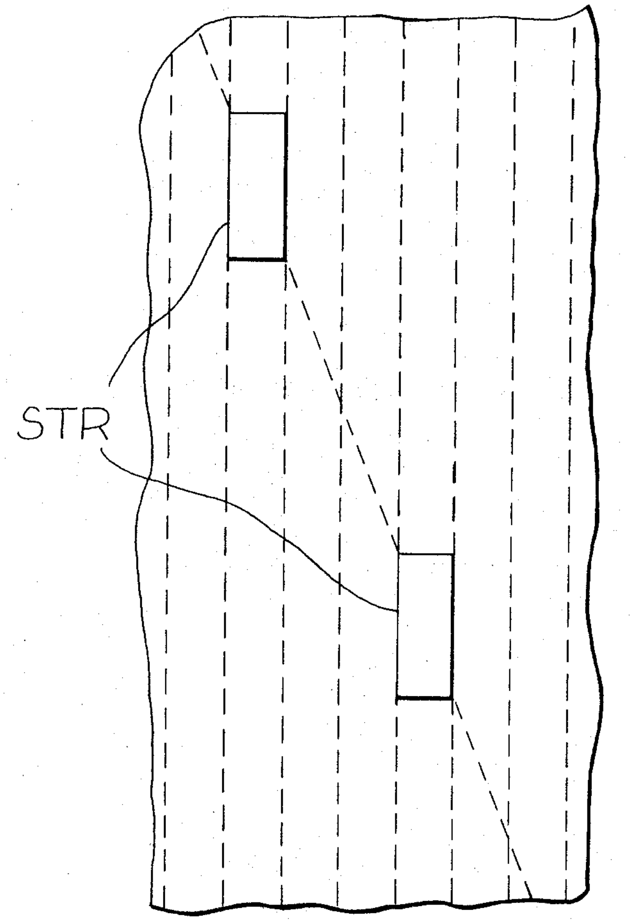
FIG. 7 is a diagram showing a moire pattern in a reproduced picture.
Figure 8:
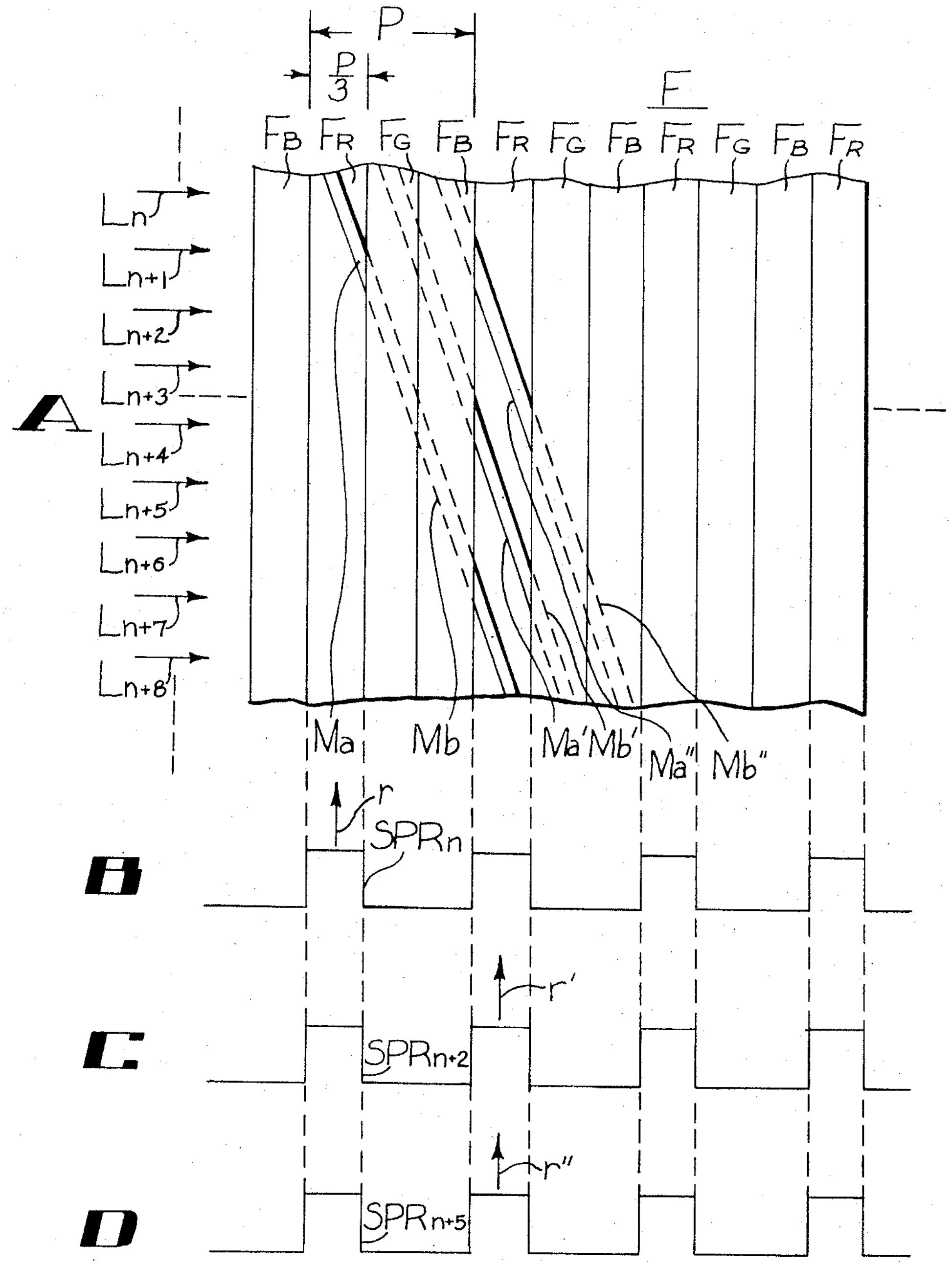
FIG. 8 is a diagram similar to FIG. 6 in accordance with the present invention.

FIG. 8 is substantially similar to FIG. 6. In FIG. 8A, reference characters Ma, Ma' and Ma'' indicate three red color-separated images of the red rod $m$ and M$b$, M$b'$ and M$b''$ indicate those portions of the image of the red rod $m$ intercepted by the green and blue optical strip filter elements $F_G$ and $F_B$ and not projected on the photoelectric conversion layer. In FIGS. 8B, 8C and 8D, reference characters $r$, $r'$ and $r''$ represent red color signals sampled by the red sampling pulses $SPR_n$, $SPR_{n+2}$ and $SPR_{n+5}$ for the scanning lines $L_n$, $L_{n+2}$ and $L_{n+5}$, respectively.

From FIG. 8 it appears that the red color signal is always sampled by the red sampling pulse for any scanning line. Accordingly, no moiré pattern is produced in the reproduced image of the red red $m$, even though this image is projected on the photoelectric conversion layer at a small angle to the optical strip filter elements $F_R$, $F_G$, and $F_B$ of the optical filter F.

As previously described, such plural images are projected on the photoelectric conversion layer at intervals of an integral multiple (once, in the example of FIG. 8) of P/N in the direction of array of the primary color component stripes of the striped color-separated image and, except in the case where this integer is appreciably great, $p$ is about several tens of microns, so that misregistration of the image in the reproduced picture is quite imperceptible to the viewer.

The foregoing description has been given in connection with a red rod $m$ and the red sampling pulses, but the same is true of objects of other colors and sampling pulses of other colors and multi-colored objects. Therefore, it is possible to avoid generation of moiré patterns of the respective colors and white moirés.

In FIG. 8, the threefold image of the object is projected on the photoelectric conversion layer 1, but twofold, fourfold, fivefold, . . . images are possible in accordance with the duty ratio 1/N of the primary color component stripes of the striped color-separated image projected on the photoelectric conversion layer 1.

Figure 9:
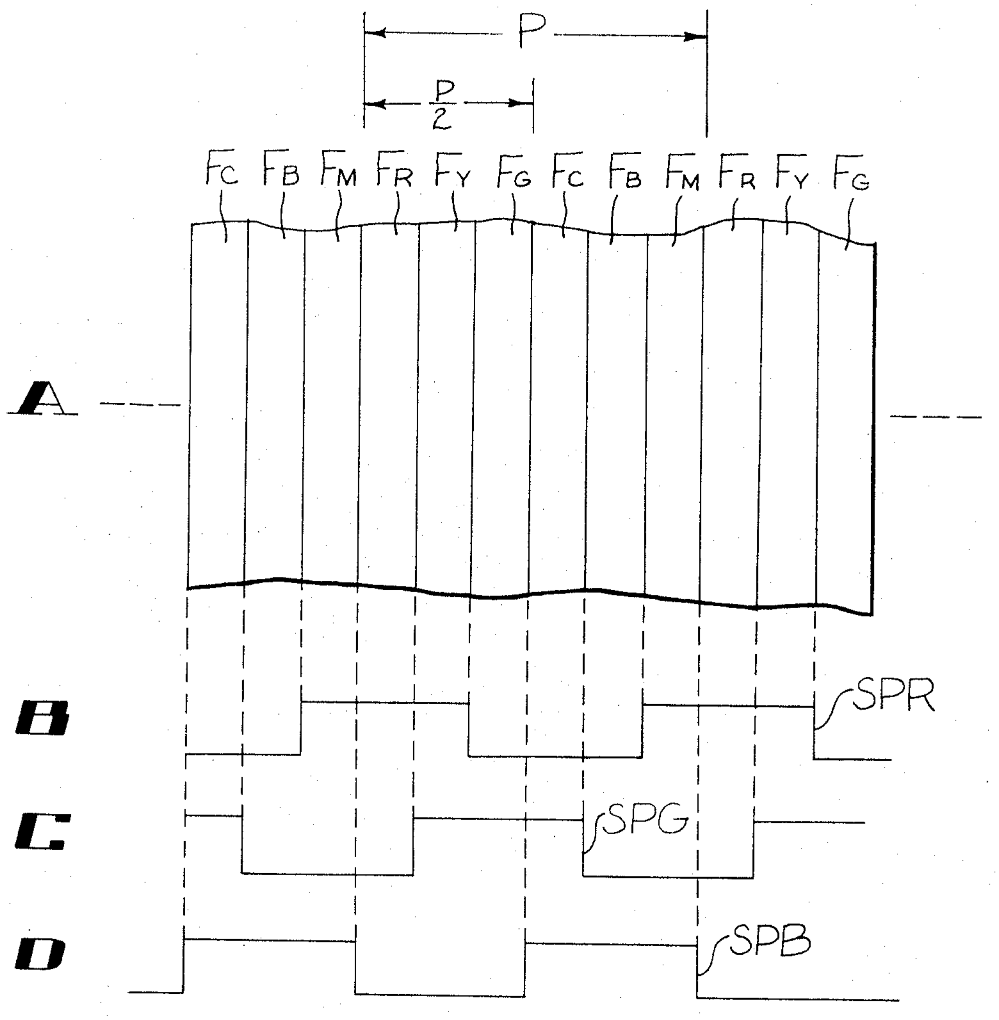
FIG. 9 is a diagram similar to FIG. 6 for explaining the present invention.

FIG. 9 illustrates a special case in which generation of the moiré can be avoided by projecting a twofold image on the photoelectric conversion layer in the color image pickup device that produces a color composite signal containing the three primary color signals. In this embodiment, an optical filter F shown in FIG. 9A is made up of red, yellow, green, cyan, blue, and magenta optical strip filter elements $F_R$, $F_Y$, $F_G$, $F_C$, $F_B$, and $F_M$ and, as depicted in FIGS. 9B, 9C, and 9D, red, green, and blue sampling pulses SPR, SPG and SPB are rectangular waves. Each has a duty ratio of ½ and they are phased, or separated in time, one-third of one cycle apart from one another. Accordingly, the red sampling signal SPR samples magenta, red, and yellow color signals, as shown in FIG. 9B, the green sampling signal SPG samples yellow, green, and cyan color signals, as depicted in FIG. 9D, and the blue sampling signal SPB samples cyan, blue, and magenta color signals as shown in FIG. 9D.

Figure 10:
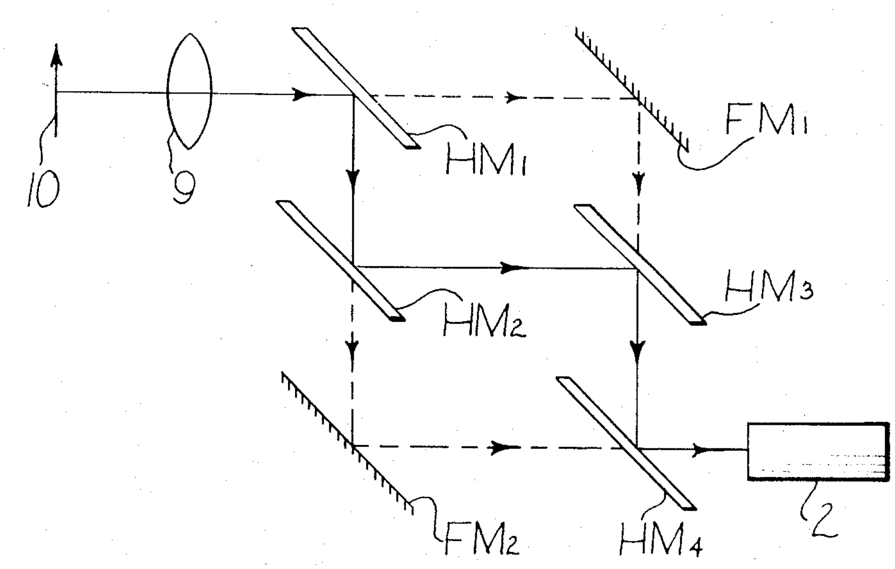
FIG. 10 shows the image-splitting optical section of one example of the color image pickup device of the present invention.

FIG. 10 shows a multiple image producing optical means for producing, in this instance, a three fold image. The optical apparatus includes a half mirror and a total reflection mirror. The multiple image-producing optical means is located between the camera lens 9 and the camera tube 2, but the lens 9 and the tube 2 are placed so that their optical axes are parallel to each other and are spaced a predetermined distance apart. Four half mirrors $HM_1$, $HM_2$, $HM_3$, and $HM_4$ are parallel to each other and at an angle of 45° to the optical axis of the camera lens 9. Light from the object 10, having passed through the camera lens 9, is reflected by the half mirrors $HM_1$ to $HM_4$ one after another to project a first image on the photoelectric conversion layer of the camera tube 2. Two total reflection mirrors $FM_1$ and $FM_2$ are arranged substantially in parallel to the half mirrors $HM_1$ to $HM_4$. The light from the object 10 that passes through the half mirror $HM_1$ is reflected by the total reflection mirror $FM_1$ to pass through the half mirror $HM_3$. This light is then reflected by the half mirror $HM_4$ to project a second image on the photoelectric conversion layer. At the same time, the light from the object 10 that is reflected by the half mirror $HM_1$ and passes through the half mirror $HM_2$ is reflected by the total reflection mirror $FM_2$ and then passes through the half mirror $HM_4$ to project a third image on the photoelectric conversion layer. The angles of the total reflection mirrors $FM_1$ and $FM_2$ to the optical axis of the camera lens 9 are selected so that the first, second, and third images may be spaced apart an integral multiple of $p/3$, as mentioned above.

Figure 11:
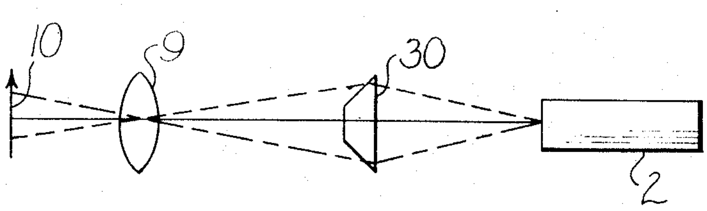
FIG. 11 shows the optical arrangement of another example of the present invention.

The threefold image-producing optical means may also be formed by a prism 30, which is of a symmetrical trapezoidal cross-section, such as is shown in FIG. 11. In this case, the optical axes of the camera lens 9 and the camera tube 2 can be aligned with each other.

Figure 12:
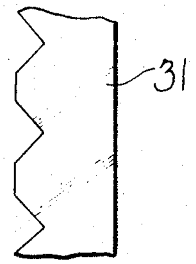
FIG. 12 is a fragmentary cross-sectional view of one example of a multiple image-forming optical means of another example of the present invention.

A micro-prism 31, shown in FIG. 12, may be used instead of the simpler prism 30 of FIG. 11. The micro-prism 31 has a large number of facets divided into groups. Each group includes three facets arranged in planes similar to those of the single prism 30 in FIG. 11.

Figure 13:
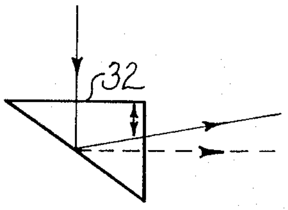
FIGS. 13–16 are side views showing other examples of the multiple image-forming optical means respectively.

The twofold image-producing optical means may be a Dove prism, such as the prism 32 shown in FIG. 13. This is one kind of reflection-type prism. Alternatively, a Rochon prism 32*a* shown in FIG. 14, a Sénarmout prism 32*b* shown in FIG. 15, or a Wollaston prism 32*c* such as depicted in FIG. 16 may be used. These are all double image prisms. Each of the prisms shown in FIGS. 13–16 employs crystallized quartz as a double reflector, but the twofold image-producing optical means may be a prism of calcite or any other one. The light emerging from these prisms is in the form of two polarized light beams oscillating perpendicular to each other. Double-headed arrows indicate the directions of those optical axes that lie in the plane of the drawing and dots in circles indicate the directions of the optical axes perpendicular to the plane of the drawing. Further, solid and broken lines extending from the prisms represent light oscillating in the plane of the sheet and in a direction perpendicular thereto, respectively.

Figure 14:
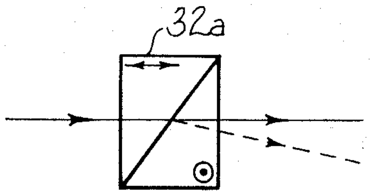
Figure 15:
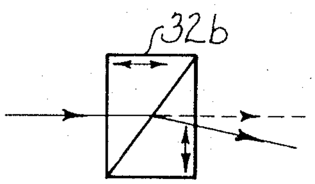
Figure 16:
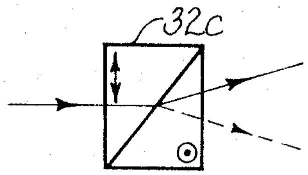
Figure 17:
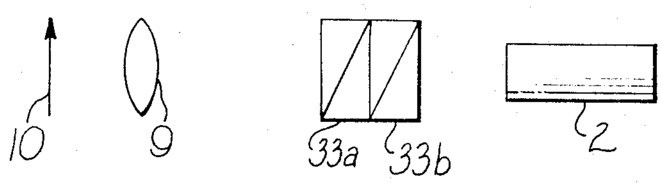
FIGS. 17 and 18 show the optical arrangement of another example of the present invention.

Two double-image prisms 33*a* and 33*b*, each of which may be a set of the prisms shown in FIGS. 14–16, may be combined for use as the threefold image-producing optical means, as shown in FIG. 17.

Figure 18:
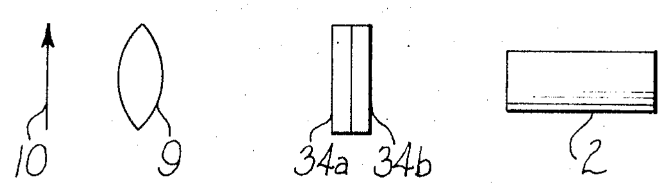

FIG. 18 shows optical means for producing a more than threefold image by forming at least two double refractors 34*a* and 34*b* as a unitary structure with their image-separating directions being different from each other. The double refractor forming the multiple image-producing optical means may be any one of crystals except isotropic ones, but the following description will be made in connection with the use of crystallized quartz as the double refractor. A description will be given first of the threefold image-producing optical means.

Figure 19:
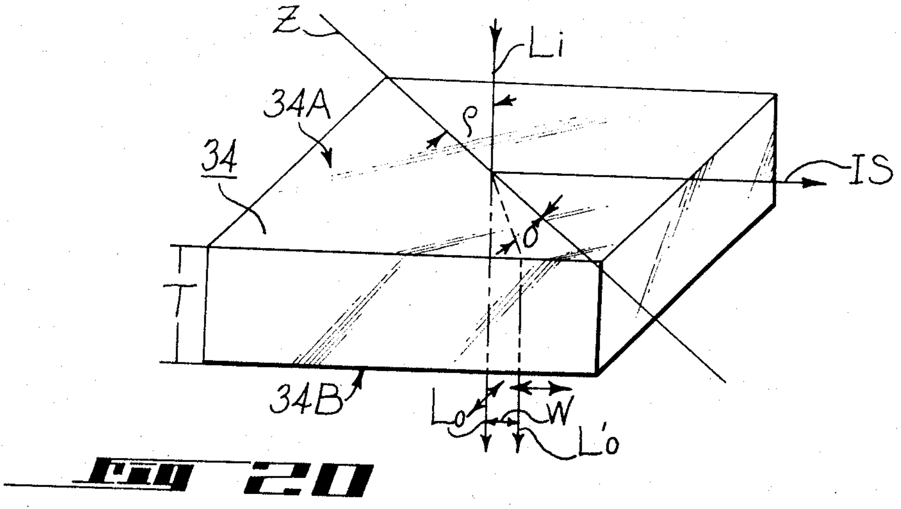
FIG. 19 is a perspective view of a crystal plate for explaining the present invention.

In FIG. 19, reference numeral 34 indicates a sheet of quartz, which is a double refractor, having parallel planes 34A and 34B. The thickness T of the sheet 34 is the distance between the planes 34A and 34B. Reference character Z designates the optical axis (Z-axis). The plane 34A is inclined at an angle of 45° to the optical axis Z. Reference character $L_i$ identifies a ray of light incident on the plane 34A of the quartz sheet 34 and $\rho$ the angle between the incident light and the optical axis Z. In this example, $\rho = 45°$. Two rays $L_0$ and $L_0'$ shown emerging from the quartz sheet 34 are an ordinary ray and an extraordinary ray, respectively. The ordinary ray $L_0$ lies on the extension of the incident ray $L_i$ and the extraordinary ray $L_0'$ deviates away from the incident ray $L_i$ (the ordinary ray $L_0$) by the distance W, which is the width of image separation. Reference character IS represents the direction of image separation, which is the direction that the extraordinary ray $L_0'$ deviates away from the ordinary ray $L_0$. This direction is in a plane perpendicular to the plane 34A of the plate 34 and including the optical axis Z. When the incident ray $L_i$ is a natural one, the ordinary ray $L_0$ becomes a straight polarized light which oscillates perpendicular to the optical axis Z and to the image-separating direction IS, and the extraordinary ray $L_0'$ becomes a straight polarized light which oscillates parallel to the image-separating direction IS. Reference character $\sigma$ designates the angle between the extraordinary ray $L_0'$ and the optical axis Z.

If the refractive index of the ordinary ray $L_0$ is taken as $n_0$ (in the case of a quartz crystal, the refractive index to a light having a wavelength of 5,893 angstroms is 1.5534) and if the refractive index of the extraordinary ray $L_0'$ is taken as $n_e$ (in the case of a quartz crystal, the refractive index to a light having a wavelength of 5,893 angstroms is 1.5443), the following equations hold true among W, T, $\rho$, $\sigma$, $n_0$ and $n_e$.

$$W/T = \tan(\rho - \sigma) \ldots \quad (1)$$

$$\tan \sigma = n_0^2/n_e^2 \cdot \tan\rho \ldots \quad (2)$$

From these equations the following equation is obtained.

$$\frac{W}{T} = \frac{1 - \frac{n_0^2}{n_e^2}}{\frac{1}{\tan \rho} + \frac{n_0^2}{n_e^2} \cdot \tan \rho} \quad (3)$$

To minimize T, it is necessary that $\tan\rho = 1$. If $n_0 = 1.5534$, $n_e = 1.5443$ and $\tan\rho = 1$ in the third equation, it follows that $W = 0.005885T$.

Accordingly, by directing the light from the object being televised to the sheet of quartz 34, a twofold image of the object can be obtained with the sheet 34.

Figure 20:
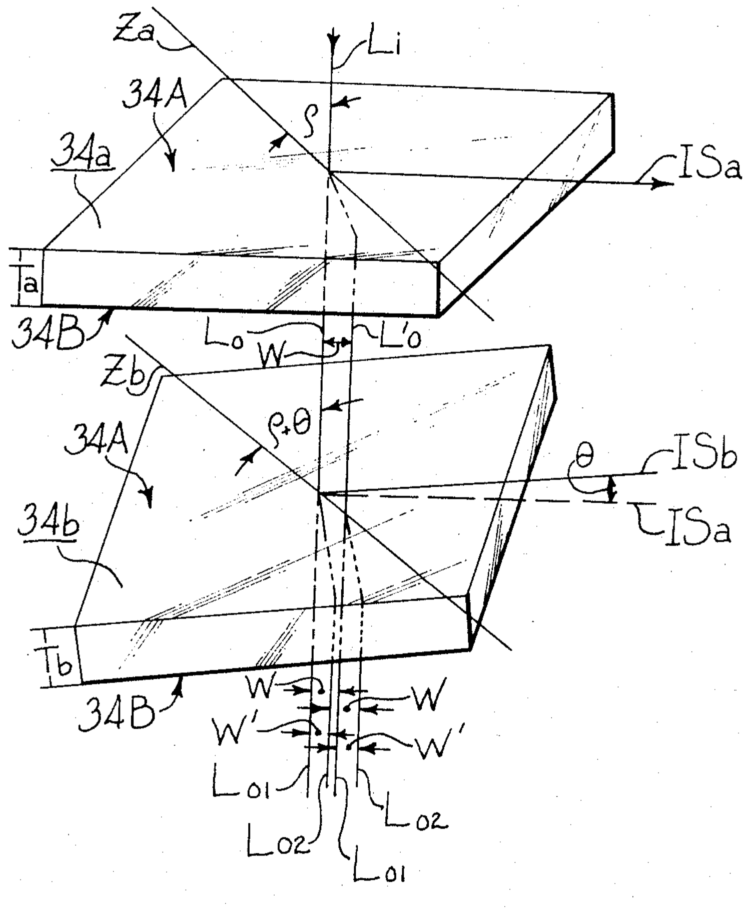
FIG. 20 is a perspective view showing two crystal plates for explaining the present invention.

It is also possible to produce four images overlapping in two dimensions by the combined use of two quartz sheets 34*a* and 34*b* which are placed so that their image-separating directions IS*a* and IS*b* are different from each other, as illustrated in FIG. 20. In this figure, parts corresponding to those in FIG. 19 are identified by the same reference numerals and characters but with suffixes with "*a*" and "*b*" added to distinguish the two quartz sheets. By an appropriate selection of the angle $\theta$ between the image-separating directions IS*a* and IS*b* of the sheets 34*a* and 34*b*, three images overlapping one another at regular intervals can be obtained. The sheets 34*a* and 34*b* are identical with each other and the plane 34A of each sheet is inclined at an angle of, for example, 45° to the optical axis Z.

In FIG. 20, the ordinary ray $L_0$ and the extraordinary ray $L_0'$ emerging from the quartz sheet 34*a* are based on an incident light ray $L_i$. The ordinary ray $L_{01}$ and the extraordinary ray $L_{02}$ emerging from the quartz sheet 34*b* are based on the incident light $L_0$. The ordinary ray $L'_{01}$ and the extraordinary ray $L'_{02}$ emerging from the quartz sheet 34*b* are based on the incident light $L'_0$. Reference character W represents the distances between the rays $L_{01}$ and $L'_{01}$ and between $L_{02}$ and $L'_{02}$, and W' represents the distances between the rays $L_{01}$ and $L_{02}$ and between $L'_{01}$ and $L'_{02}$. The distances W' can also be obtained from equations (1)–(3). Assuming that $L_0$, $L'_0$, $L_{01}$, $L'_{01}$, and $L'_{02}$ represent the intensity of the respective rays, $L_{01}$, $L_{02}$, $L'_{01}$, and $L'_{02}$ are given as follows:

$$L_{01} = L_0 \cdot \cos\theta \ldots \quad (4)$$

$$L_{02} = L_0 \cdot \sin\theta \ldots \quad (5)$$

$$L'_{01} = L'_0 \cdot \sin\theta \ldots \quad (6)$$

$$L'_{02} = L'_0 \cdot \cos\theta \ldots \quad (7)$$

Figure 21:
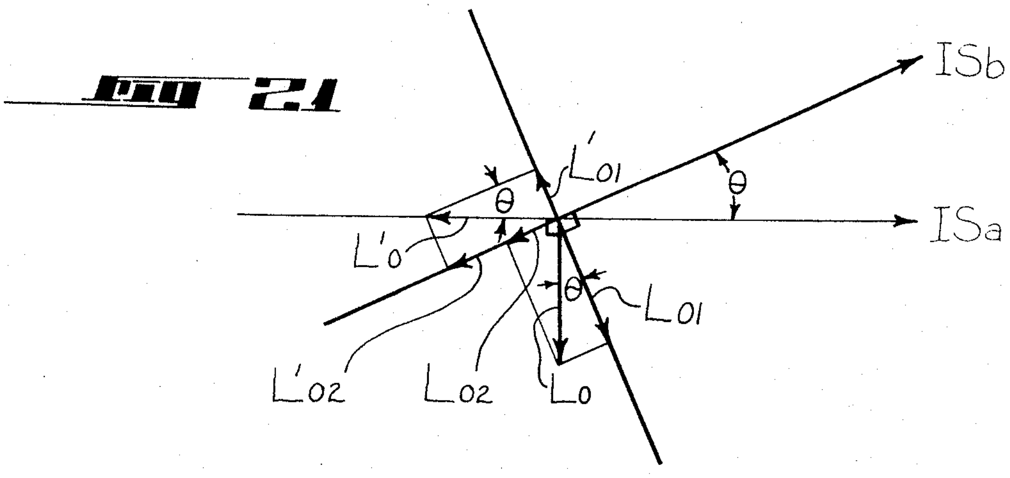
FIG. 21 is a vector diagram for explaining the present invention.

This may be seen from the vector diagram depicted in FIG. 21.

Figure 22:
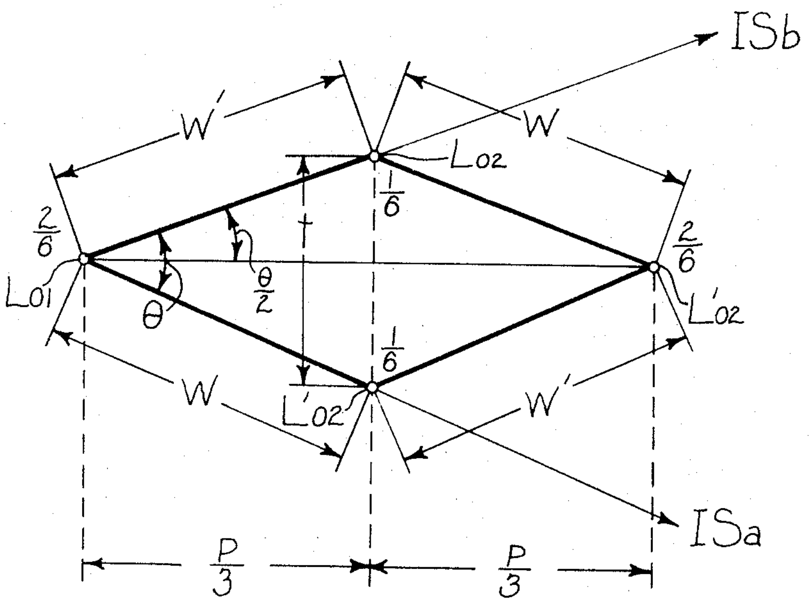
FIGS. 22 and 23 are diagrams showing the arrangement of multiple images for explaining the present invention.

The arrangement of the rays $L_{01}$, $L_{02}$, $L'_{01}$, and $L'_{02}$ of FIG. 20 in two dimensions is as shown in FIG. 22. In order that the intensity ratio of the rays $L_{01}$, $L_{02}$, $L'_{01}$, and $L'_{02}$ may be 2/6 : 1/6 : 1/6 : 2/6, equations (4)–(7) must be arranged so that $\sin\theta/\cos\theta = \tan\theta = ½$ . Accordingly, it follows that $\theta$=26°34'. FIG. 22 shows the case in which $\theta$=26°34'. In this case, the thicknesses T*a* and T*b* of the quartz sheets 34*a* and 34*b* are selected to be 3.4919mm respectively so that W cos $\theta$/2 may be equal to ⅓ of the pitch of the primary color component stripes (in the foregoing example, 20 microns), namely 20.55×cos 26°34'/2=20 (microns). The distance *t* between the rays $L_{02}$ and $L'_{01}$ is such that $t = 2W\sin\theta/2$ =2×20.55×sin 26°34'/2=9.5 (microns). The images produced by the rays $L_{02}$ and $L'_{01}$ on the photoelectric conversion layer can be regarded as one, so that three images shifted by *p*/3 relative to one another are projected on the photoelectric conversion layer.

Figure 23:
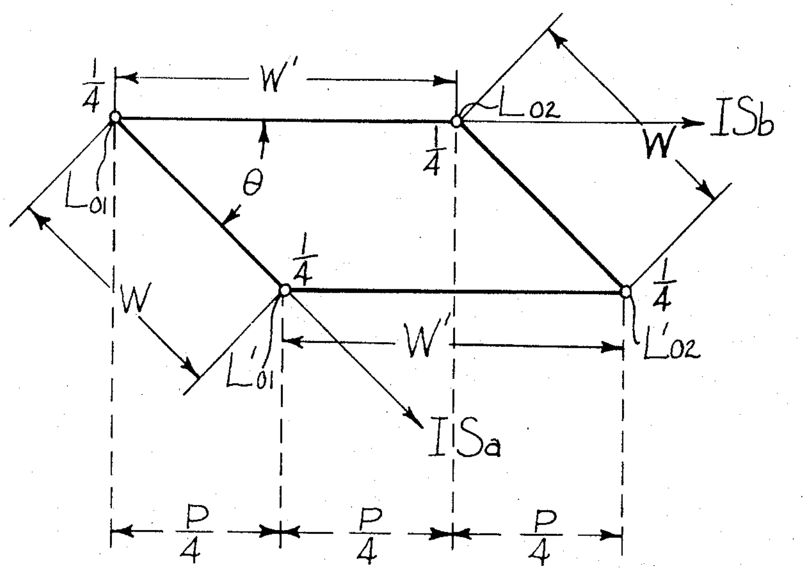

FIG. 23 illustrates the case in which a fourfold image is produced by suitably selecting the thicknesses T*a* and T*b* of the two quartz sheets 34*a* and 34*b* in FIG. 20 and the angle $\theta$ between their image-separating directions IS*a* and IS*b*. In this example, the rays $L_{01}$, $L_{02}$, $L'_{01}$, and $L'_{02}$ are of the same intensity, namely $\sin\theta/\cos\theta = \tan\theta = 1$, that is, $\theta = 45°$ and W/2 = W/2cos45° = *p*/4 in equations (4)–(7).

By combining more than three quartz sheets, multiple image-producing optical means capable of producing more than fivefold images can also be obtained. If more than two double image prisms as depicted in FIG. 17 are combined, it is possible to obtain more than a threefold image. This can be done by arranging the prisms so that their image-separating directions are different from one another, as is the case with the multiple image-producing optical means formed by combining the double refractors, as shown in FIG. 18.

Figure 24:
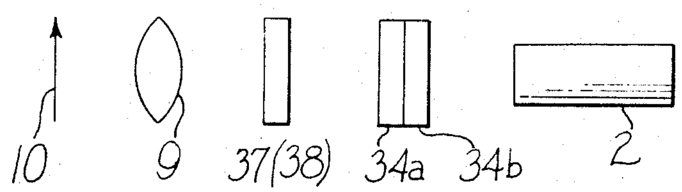
FIG. 24 shows an optical arrangement illustrating the principal part of another example of the present invention.

In those optical means shown in FIGS. 13–18 which are double refractors, when the light from the object being televised is a perfectly reflected one like a reflected light from a metal or enamel, the reflected light from the object is not a natural light but a straight polarized one, so that a multiple image cannot be produced and a moiré is likely to appear. To avoid this, FIG. 24 shows an optical rotatory means 37, which may be of quartz having a rotatory dispersion action, is interposed between the object 10 to be televised and the multiple image-producing optical means consisting of at least two double refractors. In this embodiment, the double refractors are the quartz sheets 34*a* and 34*b*, which are placed so that their image-separating directions are different from each other. The optical rotatory means 37 is located between the camera lens 9 and the multiple image-producing optical means 34*a* and 34*b*. In this case, the optical rotatory means 37 may be formed as a unitary structure with the quartz sheets 34*a* and 34*b* to make up the multiple image-producing optical means. When quartz is used as an optical rotatory means having the rotatory dispersion action, it is arranged so that the incident light thereon may be aligned with the optical axis of the optical rotatory means. Further, the thickness of the optical rotatory means, which is preferably greater than several wavelengths of the incident light, is so selected as to obtain a suitable optical rotatory amount from the incident light of an appropriate wave-length range. The proper rotatory amount is dependent upon the wavelength of the incident light. Providing adequate rotation insures that the light emerging from the optical rotatory means 37 can be sufficiently separated by the multiple image-producing optical means. In addition to quartz, other optical rotatory means having the rotatory dispersion action include: $Bi_{12}GeO_{20}$, $Bi_{12}$, $SiO_{20}$, $17Bi_2O_3$: $Ga_2O_3$, $7Bi_2O_3$: $Z_nO$ and others.

In FIG. 24, the optical rotatory means 37 may be replaced with a double refractor means 38 of quartz, mylar, or the like, in which case the double refractor means is oriented with its optical axis substantially perpendicular to the light path. In this case, the thickness of a quartz sheet, for example, is suitably selected and the oscillating direction of the straight polarized light incident on the quartz sheet in a direction substantially perpendicular to its optical axis is suitably rotated to ensure that the light emerging from the quartz sheet can be separated by the multiple image-producing optical means. Such a double refracting means may consist of any crystals except isotropic ones.

What is claimed is:

1. A color image pickup device in which a striped color-separated image of an object to be televised is projected through a striped color filter on the photoelectric conversion layer of an image pickup tube, said device comprising:

A. Multiple image producing optical means interposed between the object and said filter for projecting N images of said object on said photoelectric conversion layer spaced apart an integral multiple of *p*/N in the direction of array of color component stripes of said filter, where the duty cycle and pitch of the primary color component stripes are 1/N and $p$ respectively.

2. A color image pickup device in which a striped color-separated image of an object to be televised is projected through a striped color filter on the photoelectric conversion layer of an image pickup tube, said device comprising: multiple image producing optical means interposed between the object and said filter for projecting N images of said object on said photoelectric conversion layer spaced apart an integral multiple of $p$/N in the direction of array of color component stripes of said filter, where the duty cycle and pitch of the primary color component stripes are 1/N and $p$ respectively, wherein said multiple image producing means includes at least two optical double refractors disposed in such a manner that their image separating directions are different from each other.

3. A color image pickup device as claimed in claim 2, said pickup device comprising, in addition, an optical rotatory means located between said object and said multiple image-producing optical means.

4. A color image pickup device as claimed in claim 2, said pickup device comprising, in addition, a double refracting means located on a light path between said object and said multiple image-producing optical means in such a manner that the optical axis of the double refracting means is substantially perpendicular to said light path.

5. A color image pickup device as claimed in claim 1 in which said multiple image means comprises prism means between said object and said photoelectric conversion layer to direct light from said object to a plurality of slightly displaced image locations on said conversion layer.

6. A color image pickup device as claimed in claim 5 in which said prism means comprises a single, trapezoidal prism.

7. A color image pickup device in which a striped color-separated image of an object to be televised is projected through a striped color filter on the photoelectric conversion layer of an image pickup tube, said device comprising: multiple image producing optical means interposed between the object and said filter for projecting N images of said object on said photoelectric conversion layer spaced apart an integral multiple of $p$/N in the direction of array of color component stripes of said filter, where the duty cycle and pitch of the primary color component stripes are 1/N and $p$ respectively, wherein said multiple image means includes prism means between said object and said photoelectric conversion layer to direct light from said object to a plurality of slightly displaced image locations on said conversion layer, said prism means including a micro-prism having a plurality of groups of facets.

8. A color image pickup device in which a striped color-separated image of an object to be televised is projected through a striped color filter on the photoelectric conversion layer of an image pickup tube, said device comprising: multiple image producing optical means interposed between the object and said filter for projecting N images of said object on said photoelectric conversion layer spaced apart an integral multiple of $p$/N in the direction of array of color component stripes of said filter, where the duty cycle and pitch of the primary color component stripes are 1/N and $p$ respectively, wherein said multiple image means includes a plurality of half mirrors to divide light from said object into a plurality of light paths directed toward slightly separated locations on said photoelectric conversion layer.

9. A color image pickup device in which a striped color-separated image of an object to be televised is projected through a striped color filter on the photoelectric conversion layer of an image pickup tube, said device comprising double refracting optical means interposed between the object and said filter for projecting N images of said object on said photoelectric conversion layer spaced apart in integral multiple of $p$/N in the direction of array of color component stripes of said filter, where the duty cycle and pitch of the primary color component stripes are 1/N and $p$ respectively.

10. A color image pickup device as claimed in claim 9 in which said double refracting means comprises a sheet of quartz.

* * * * *